United States Patent [19]

Klumpp

[11] 4,402,252
[45] Sep. 6, 1983

[54] WEAPON COUNTER-RECOIL DAMPENING MECHANISM FOR A MACHINE CANNON HAVING A WEDGE TYPE BREECH BLOCK

[75] Inventor: Walter Klumpp, Duisburg, Fed. Rep. of Germany

[73] Assignee: Rheinmetall GmbH., Duesseldorf, Fed. Rep. of Germany

[21] Appl. No.: 254,758

[22] Filed: Apr. 16, 1981

[30] Foreign Application Priority Data

Apr. 19, 1980 [DE] Fed. Rep. of Germany ....... 3015102

[51] Int. Cl.$^3$ ............................................. F41F 19/12
[52] U.S. Cl. ................................ 89/43 R; 188/322.15
[58] Field of Search ................ 89/37 GM, 43 R, 177; 188/317, 322.15

[56] References Cited

U.S. PATENT DOCUMENTS 1,298,078  3/1919  Mole ................................... 89/43 R Primary Examiner—Stephen C. Bentley

[57] ABSTRACT

An improved counter-recoil dampening and braking mechanism for a machine cannon. The mechanism includes a cylinder which is secured to the gun barrel or housing of the machine cannon. A stationary piston is mounted inside the cylinder and has a pair of hollow piston rods extend in opposite axial directions from the stationary piston and respectively divides the cylinder into front and rear chambers. A front and rear end wall closes respectively the cylinder at its front and rear end wall. The front and rear hollow piston rods are respectively slidably disposed in the front and rear end walls of the cylinder. The front hollow piston rod is operatively secured to the cradle of the machine cannon. A flying piston is slidably disposed in the front hollow piston rod. The stationary piston has a first passage which coacts with a cover in the rear chamber to permit the flow of hydraulic fluid rearwardly during recoil; the cover sealing the first passage during counter-recoil. The stationary piston further having a first and a second throttling nozzle which coacts with the flying piston to permit the flow of hydraulic fluid forwardly from the rear chamber into the front chamber, so that first a strong braking action and then a reduced braking action is exerted on the cylinder during counter-recoil.

9 Claims, 1 Drawing Figure

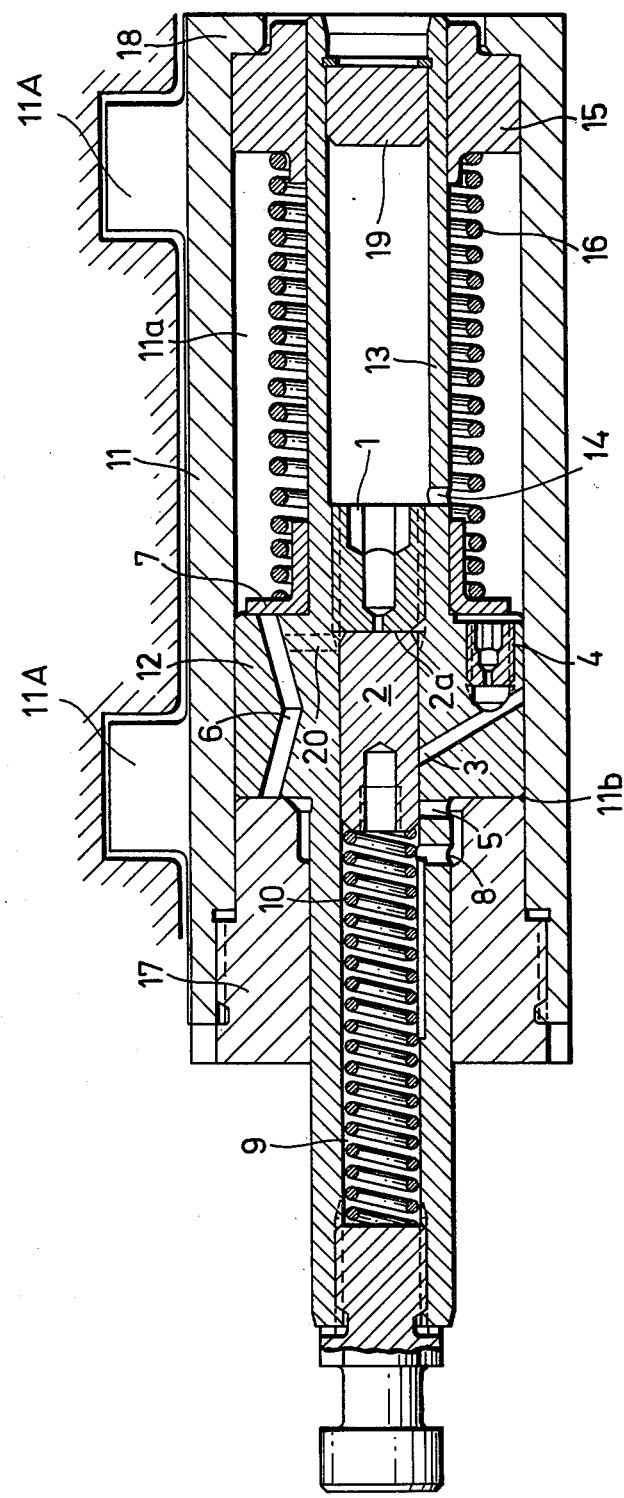

WEAPON COUNTER-RECOIL DAMPENING MECHANISM FOR A MACHINE CANNON HAVING A WEDGE TYPE BREECH BLOCK

SUMMARY OF THE INVENTION

The invention relates to a counter-recoil dampener for a machine cannon.

Such dampeners are for example disclosed in German Pat. No. 217,924. The German patent does not describe a machine cannon, but a weapon having a counter-recoil feature, with which after each shot the breech block is rearwardly held. This corresponds to the firing of individual shots with a machine cannon. However, a machine cannon also is supposed to fire bursts of different cadences, for example 500 to 1000 shots per minute.

By means of the construction of this known gun barrel recoil-counter-recoil arrangement a counter-recoil brake is automatically activated, after complete recoil of the gun barrel, when the latter is to be accelerated by means of a recuperation mechanism, that is the acceleration forwardly is limited, so that the gun barrel only moves forwardly slowly. Thereby the shock imparted onto the piston rod mounting at the end of the gun barrel recoil is reduced and a counter-acting kinetic energy is provided for the recoiling gun barrel in the next shot.

Such a uniform one-stage acting brake is not adequate for the demands of modern machine guns having wedge-type breech blocks for the following reasons:

A machine cannon has insufficient stored energy to uniformly brake over the entire counter-recoil path and would, at the next shot, which by necessity has to brake prior to the reaching of the rest position, have imparted on the arrangement a continuously increasingly rearwardly displaced gun barrel recoil during a firing burst.

With a machine cannon having a straight path breech block the weapon housing is even a further time propelled rearwardly by means of the impacting of the breech block on to the shock absorber after the recoil shock and only thereafter moves forwardly. Thereby the time for the counter-recoil motion is extended up to the next shot. This is required, because the next shot must be braked while the weapon housing is still in the counter-recoil motion. This balancing of gun barrel counter recoil motion and braking for the next shot with different cadences is designated as "a floating gun mount" or a "firing out of battery" gun mount. Such mount is required to avoid shock loads on the gun carriage.

In machine cannons having a wedge-type breech block these time delays do not occur. The weapon housing moves immediately forwardly after gun barrel rest at the end of the recoil and is positioned in the forward zero position, that is the weapon is advanced to the mounting position, before the next shot breaks. The weapon has therefore no so-called "floating gun mount" by means of which the firing load on the gun mount is reduced.

The aforedescribed drawback cannot be mitigated or avoided by means of the inclusion of a one-step uniformly acting counter-recoil brake in accordance with the German Pat. No. 217,924 because of the following reasons:

A uniform dampening or braking of the entire counter-recoil has the disadvantageous effect, that too little kinetic energy is present in the counter-recoiling masses.

SUMMARY OF THE INVENTION

It is an object of the invention to provide an operative counter-recoil dampening or braking mechanism for a machine cannon with a wedge-type breech block. As a first feature there is provided a reduced, slow, and thereafter rapid counter-recoil movement of the weapon housing with the gun barrel and thereby at the end of the counter-recoil movement an increased counter-recoil energy is available to counteract the next fired shot. The dampener is therefore of simple, robust and safe construction and in particular the dimensions of the assembly, in particular the length and diameter of the brake cylinder, are of relatively small size. By utilizing the hollow space in the piston rod the spatial requirements of the arrangement for the braking fluid is reduced in the inner ring chamber of the cylinder.

In the first braking or dampening stage and the practically unbraked counter-recoil of the second braking stage there can be achieved an intermediate stage, in which there is effected an even weaker braking as in the first stage, in such a way, that a communication opening in the piston rod between the piston rod inner space and the forward ring chamber of the cylinder is so arranged that it is only then exposed by the flying piston when it has traversed a further predetermined distance along its operative path. This has the advantage, that the counter-recoiling mass after its reversal at the recoil spring only slightly and slowly is counter-recoiled. The time period for the slow counter-recoiling movement is adjusted by the filling of the cylinder with brake fluid, which must flow through a throttling nozzle, and can be so adjusted that it can be coordinated to the desired cadence.

The return movement of the flying piston into its starting position for the counter-recoil is attained during recoil in that a second communication opening between the inner space of the piston rod and the forward ring chamber is provided, which during recoil movement is first covered by the flying piston and after a predetermined traversing of the operative path of the cylinder and the piston is released (exposed), so that then brake fluid can flow through the piston rod and, aided by the spring in the rear ring chamber of the cylinder, push back the flying piston into its starting position.

The storing of a large volume oil into the cylinder with a compact construction of the cylinder is particularly attained by that the stationary piston also has at its backside a second hollow piston rod, which extends to the rear ring chamber of the cylinder, and its inner chamber is in communication via an opening with the rear ring chamber. Therefore the inner chamber of the second piston rod is also adapted to receive brake fluid. By virtue of the fact that the second piston rod has an identical or nearly identical diameter as the first piston rod, there is attained that the stationary piston transports the same amount of oil with both directional movements of the cylinder.

A secure functioning of the nozzle is attained by that the nozzle cover for sealing the passage in the stationary piston is held by means of a spring mounted about the second piston rod, which abuts against the rear end face of the cylinder.

The arrangement also has an exchangeability feature for the nozzle so that a nozzle of a different through-passage for purposes of attaining a different braking action can be installed, which exchangeability feature is achieved in that the nozzles are removably mounted in openings of the stationary piston, preferably are threadably mounted therein.

A very surprisingly simple construction, which permits an assembly from one side, is achieved by that the forward end wall of the cylinder is slidably guided over the first piston rod and is threadably mounted in the cylinder, whereas the rear end wall is slidably guided over the second piston rod, and is adapted to be slid in from the forward end of the cylinder and abuts against an inwardly projecting ring flange at the rear end of the cylinder.

In order to facilitate the introduction of the brake fluid the end face of the second piston rod can be covered by means of a stopper.

BRIEF DESCRIPTION OF THE DRAWING

With these and other objects in view which will become apparent in the following detailed description, the present invention, which is shown by example only, will be clearly understood in connection with the accompanying single figure of the drawing, in which:

FIG. 1 is a longitudinal section of the recoil mechanism in which the movable cylinder is shown in its rear position, that is after recoil of the gun barrel and before the beginning of the counter-recoil movement.

DETAILED DESCRIPTION

The construction of the dampener or braking mechanism is as follows:

The cylinder 11 is secured to the weapon housing, (not illustrated) by means of projecting cams 11A, that is it is provided with a movably cylinder 11 and has at its rear an inwardly extending ring flange 18. The rear end face 15 of the cylinder abuts against this ring flange 18. At its forward end the cylinder is closed by means of an end face 17 which is threadably mounted therein. A piston rod 9 is slidable within the end face 17. This piston rod 9 is fixedly secured to the cradle support for the gun barrel, and supports at its other end the piston 12, which has at its rear side a second hollow piston rod 13 axially extending rearwardly therefrom. The rod 13 is slidably mounted in a bore of the rear end face insert 15. In the rear ring chamber 11a of the cylinder there is disposed in front of the passage 6 of the piston 12 the nozzle plate 7, which is maintained in its sealing position by means of a spring 16. Furthermore, there is arranged on the rear side of the piston 12 inside the hollow piston rod 13 a nozzle 1 of small cross-section, for example 0.3 mm and a nozzle 4 is arranged outside the rod 13 of larger cross-section, for example 0.7 mm. The nozzle passage of the nozzle 4 is connected via a conduit 3 with the inner space of the piston 12, over which there is disposed the flying piston 2 in a position which is illustrated in the drawing. The coil spring 10 abuts against the flying piston 2 and is disposed in the inner space of the piston rod 9. The inner space of the piston rod 9 is in communication with the forward ring chamber 11b via the passages 5 and 8. The inner space of the piston rod 13 is in communication with the rear ring chamber 11a via passage 14. The functioning of the new dampening braking arrangement is as follows:

The oil which is in the rear right ring chamber 11a flows during counter-recoil of the weapon, that is during the movement of the cylinder 11, gun barrel and housing towards the left in the drawing, through a bore in the piston 12, in which there is threadably mounted the nozzle 1, eventually into the hollow piston rod 9. This is effected by the fluid flowing through nozzle 1 against the piston rear side 2a, thereby moving the flying piston 2 against the action of spring 10. The displaced oil can then flow into the forming left ring chamber 11b in the following manner: After the traversing of a predetermined distance of the operative path of the piston 2, there is opened a communication passage 3 in the piston 12, through which now further oil can flow out of the nozzle 4. The piston 2 is now rapidly moved further and exposes, after traversing a short path, the communication passage 5, through which the oil from the nozzle 1 and 4 can now freely flow into ring chamber 11b, so that the weapon now runs more rapidly forwardly.

During the recoil of the weapon, that is during movement of the cylinder 11 towards the right in the drawing, the oil flows out of the forward (left) ring chamber 11b through the passage 6 in the piston 12 into the rear ring chamber 11a, whereby the nozzle and passage cover 7 is lifted off. Simultaneously the oil also flows through the communication passage 8 into the hollow piston rod 9 and slides, supported by the pressure coil spring 10, the piston 2 again into the illustrated end position. Since the oil escapes behind the piston 2 through the nozzle 1 only too slowly, there is provided as illustrated in dashed lines, the conduit 20, which is in communication with the passage 6 in front of the nozzle cover 7.

By means of this construction of the dampener there is achieved a short-time-period dwelling of the weapon in the rear position which thereafter is counter-recoiled with increased velocity. Thereby there is furnished more energy to counteract the next shot as is in the case with a uniform strong-braking of the entire counter-recoil movement of the weapon.

Although the invention is illustrated and described with reference to one embodiment thereof, it is to be expressly understood that it is in no way limited to the disclosure of such a preferred embodiment, but is capable of numerous modifications within the scope of the appended claims.

I claim:

1. In a machine cannon with a wedge type breech block, an improved counter-recoil dampening and braking mechanism comprising a longitudinally slidably cylinder secured to the housing of the machine cannon and a stationary piston having a pair of oppositely axially extending piston rods disposed therein and dividing the interior of said cylinder into a front and a rear chamber, one of said piston rods being secured to the stationary cradle of the machine cannon, said stationary piston having first throttling passage means adapted to provide a nearly unbraked passage of hydraulic braking fluid therethrough during recoil of the cannon from a first side of said stationary piston to the other side of said stationary piston, and said stationary piston having second passage means of reduced cross-section relative to said first passage means adapted to provide a braked passage of hydraulic braking fluid from said other side of said stationary piston to said first side during counter-recoil, the improvement comprising, said one piston rod being hollow and having a flying piston having a front and rear side slidably disposed therein and a coil spring biasing said flying piston towards said second passage means, the rear side of said flying piston being adapted to be pressured by hydraulic fluid flowing from said rear chamber through said second passage means during counter-recoil of the machine cannon and third throttling passage means disposed in said stationary piston, and after said flying piston has traversed a predetermined first distance is adapted to be additionally pressured by hydraulic fluid flowing from said rear chamber through said third passage means, whereby there is exerted on said cylinder during counter-recoil first a strong braking action and then a reduced braking action.

2. In a machine cannon with a wedge type breech block, the improvement of a counter-recoil dampening and braking mechanism as set forth in claim 1, wherein said third throttling passage means includes a first passage in said one piston rod for the flow of hydraulic fluid from the interior of said one hollow piston rod into said front chamber, said first passage only being unblocked after said flying piston has traversed a predetermined additional second distance.

3. In a machine cannon with a wedge type breech block, the improvement of the counter-recoil dampening and braking mechanism as set forth in claim 2, wherein said third throttling passage means includes a second passage in said one hollow piston rod for the flow of hydraulic fluid from the interior of said one hollow piston rod into said front chamber, said second passage being first blocked by said flying piston during recoil and only being unblocked after said flying piston and cylinder have traversed a predetermined third distance, whereby hydraulic fluid can flow through said second passage and return pressure with the aid of the action of said coil spring said flying piston to its starting position during counter-recoil.

4. In a machine cannon with a wedge type breech block, the improvement of the counter-recoil dampening and braking mechanism as set forth in claim 3, wherein said other piston rod also is hollow and extends through said rear chamber, and a third passage in said other hollow piston rod for the flow of hydraulic fluid between the interior of the other hollow piston rod and the rear chamber of the cylinder.

5. In a machine cannon with a wedge type breech block, the improvement of the counter-recoil dampening and braking mechanism as set forth in claim 4, including cover means operatively mounted in said rear chamber, and biasing means mounted in said rear chamber and coacting with cover means so as to block said first passage means in the stationary piston during recoil.

6. In a machine cannon with a wedge type breech block, the improvement of the counter-recoil dampening and braking mechanism as set forth in claim 5, wherein said second and third passage means are in the form of nozzles which are threadably mounted in said stationary piston.

7. In a machine cannon with a wedge type breech block, the improvement of the counter-recoil dampening and braking mechanism as set forth in claim 5, wherein said cylinder has a front and rear end wall, said biasing means are in the form of a second coil spring which is coaxially mounted around said other piston rod and whose front end abuts against the cover means and whose rear end abuts against the rear end wall of the cylinder.

8. In a machine cannon with a wedge type breech block, the improvement of the counter-recoil dampening and braking mechanism as set forth in claim 7, wherein the one hollow piston rod is slidably disposed in said front end wall of said cylinder, said front end wall being threadably mounted in said cylinder, said other hollow piston rod being slidably disposed in said rear end wall of said cylinder, said cylinder having an inwardly projecting ring flange at its rear end and said rear end wall being slidably insertable through the front end of said cylinder and made to abut against said ring flange.

9. In a machine cannon with a wedge type breech block, the improvement of the counter-recoil dampening and braking mechanism as set forth in claim 8, including a stopper mounted in said other hollow piston rod at its rear free end so as to seal it after the dampening and braking mechanism has been filled with hydraulic fluid.

* * * * *